United States Patent [19]

Lundberg

[11] 4,269,095
[45] May 26, 1981

[54] STOP MECHANISM FOR RADIAL ARM SAW

[76] Inventor: Bror Lundberg, Rte. 5, Box 1251, Camano Island, Wash. 98292

[21] Appl. No.: 108,806

[22] Filed: Dec. 31, 1979

[51] Int. Cl.³ .......................... B27B 27/02; B27B 5/20
[52] U.S. Cl. ..................................... 83/391; 83/268; 83/467 A; 83/468
[58] Field of Search ............ 83/391, 268, 468, 467 A, 83/467 R, 522, 581, 471.2, 471.3; 33/76 R

[56] References Cited

U.S. PATENT DOCUMENTS

| 2,892,474 | 6/1959 | Hiebert | 83/468 |
| 3,192,814 | 7/1965 | Zimmerman | 83/581 X |
| 3,910,142 | 10/1975 | Jureit et al. | 83/268 X |
| 4,111,088 | 9/1978 | Ziegelmeyer | 83/471.2 |

Primary Examiner—Donald R. Schran
Attorney, Agent, or Firm—Seed, Berry, Vernon & Baynham

[57] ABSTRACT

A stop mechanism for facilitating the cutting of an elongated workpiece into a large number of equally sized pieces with a radial arm saw. An elongated rail extends perpendicularly beneath the arm to serve as a guide for the workpiece as it is fed into the saw from the infeed side to the outfeed side of the table. An elongated infeed guide which is parallel to the rail spaces the workpiece from the rail as it is fed into the saw. A stop mechanism includes a housing which is secured to the outfeed side of the table and a plunger which moves toward the rail in an extended position and away from the rail to a retracted position. As the workpiece is guided toward the outfeed side of the table, the end of the workpiece contacts the extended plunger thereby terminating further infeed. The workpiece is then cut with the saw, and the plunger is momentarily retracted to allow additional infeed of the workpiece. The end of the workpiece for the next cut then abuts the extended plunger. The dimensional relationships between the infeed guide, workpiece width and plunger stroke are such that the workpiece always contacts the plunger in its extended position but always clears the plunger in its retracted position. Furthermore, sufficient clearance is provided between the extended plunger and the rail to allow passage of cut pieces of workpiece therebetween.

6 Claims, 6 Drawing Figures

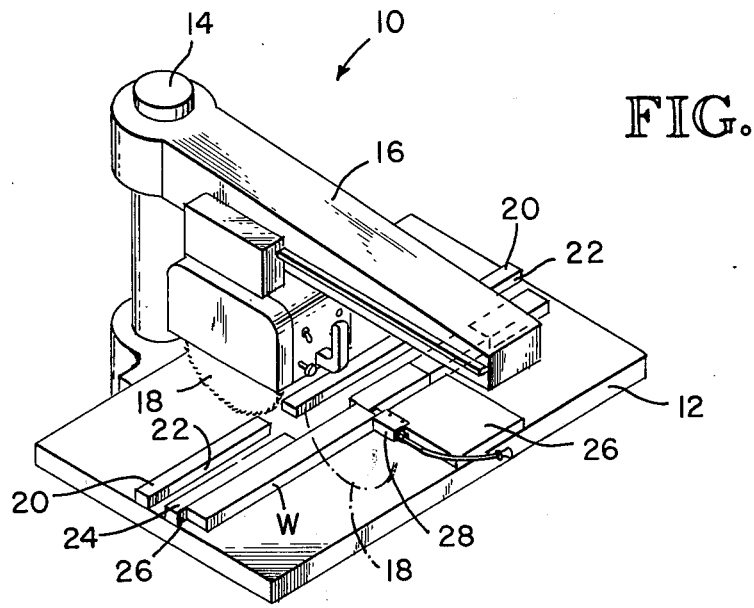
FIG. 1
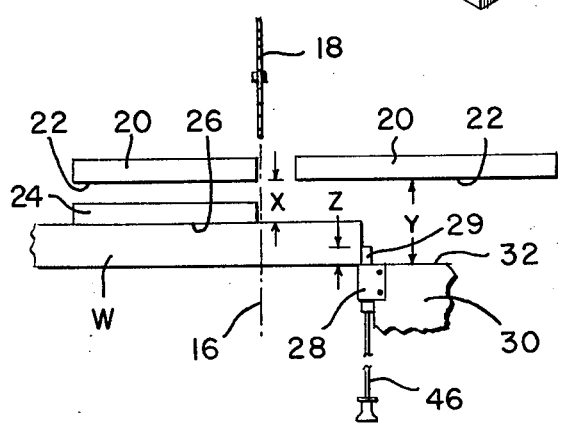
FIG. 2
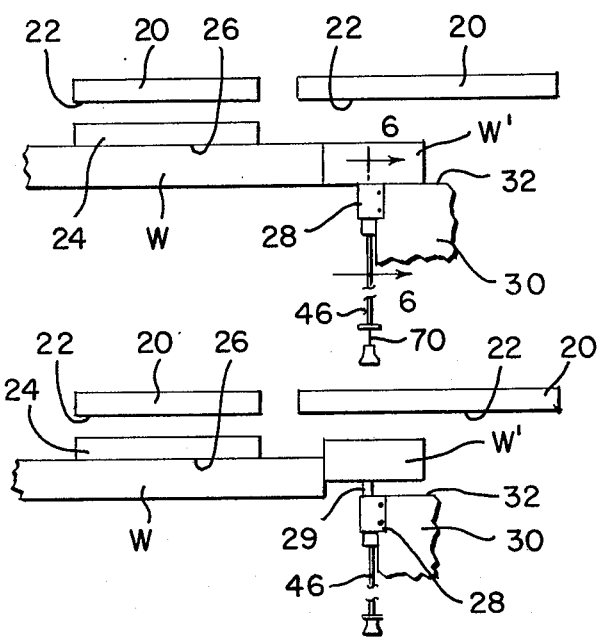
FIG. 3
FIG. 4

STOP MECHANISM FOR RADIAL ARM SAW

BACKGROUND OF THE INVENTION

1. Field of the Invention

This invention relates to radial arm saws, and more particularly to a stop mechanism for controlling the length of workpiece infeed for each cut of the saw to facilitate the rapid and accurate production of a large number of equally sized pieces.

2. Description of the Prior Art

In many manufacturing processes it is necessary to cut an elongated workpiece such as a board into a large number of equally sized pieces. Such cutting can advantageously be accomplished with a radial saw slidably mounted on a horizontal arm which is suspended above a horizontally disposed planar table. The principal problem involved in using such saws for the above-described purpose is the time required to ensure that the pieces are accurately cut. Certainly, the operator of the radial arm saw can measure each piece individually either with a scale or reference piece, but this procedure requires the operator to make a measurement and mark a board in accordance with the measurement before each cut. This requires the operator to remove his hand from the saw and possibly change his position to perform the measurement and marking. Also, the need for the operator to place his hands on the workpiece near the track of the saw to measure and mark the workpiece exposes the operator's hands to possible injury from the rotating sawblade.

The workpiece may be cut into a large number of equally sized pieces by utilizing a mechanical stop to control the distance which the workpiece is fed into the saw for each cut. One such device is disclosed in U.S. Pat. No. 2,892,474 issued to Hiebert. In the Hiebert device a stop is normally positioned above the workpiece, but is actuated downwardly into the path of the workpiece by a relay. However, it is necessary for the cut piece to be moved clear of the stop before the stop is once again lowered to limit the feed of the workpiece into the saw. Significantly, the advancing end of the uncut workpiece could not be used to move the cut piece clear of the stop since the cut piece would prevent the stop from projecting downwardly to a position where it could abut the end of the workpiece to terminate infeed. Additionally, the range of workpiece thickness which the stop mechanism can accommodate is limited.

SUMMARY OF THE INVENTION

It is an object of the invention to provide a stop mechanism which can be easily and quickly installed on virtually any conventionally used radial arm saw.

It is another object of the invention to provide a stop mechanism for a radial arm saw which can easily accommodate a variety of workpiece widths, lengths and thicknesses.

It is a further object of the invention to provide a stop mechanism for a radial arm saw which allows the advancing workpiece to move cut pieces clear of the stop mechanism.

It is a still further object of the invention to provide a stop mechanism for a radial arm saw which can be actuated by a saw operator without removing his hands from the saw.

These and other objects of the invention are provided by a stop mechanism for a radial arm saw of the type having a radial saw slidably mounted on an arm which extends horizontally above a planar table. The table has an elongated rail extending perpendicularly beneath the arm which is customarily used for guiding an elongated workpiece beneath the arm from an infeed side to an outfeed side of the table. The stop mechanism includes an elongated infeed guide mounted on the infeed side of the table having a planar guide surface extending parallel to the rail a first distance therefrom. A stop member is mounted on the outfeed side of the table. The stop member is movable toward and away from the rail between respective extended and retracted positions. The distance between the rail and the stop member in its retracted position is greater than the sum of the first distance and the width of the workpiece so that the infeed end of a cut piece of workpiece can clear the stop member in its retracted position. Additionally, the distance between the rail and stop member in its extended position is less than the sum of the first distance and the width of the workpiece so that the end of the workpiece strikes the extended stop member. Finally, the distance between the rail and the retracted stop member is greater than the sum of the width of the workpiece and the stroke of the stop member so that cut pieces of workpiece can fit between the rail and the stop member in its extended position. An actuator, which may be remotely mounted, selectively moves the stop member to its extended position as the workpiece is advanced along the infeed guide so that the end of the workpiece contacts the stop member a predetermined distance beyond the track of the radial saw. The radial saw is then moved along the arm to cut the workpiece. After the cut has been completed, the stop member is momentarily retracted to allow the workpiece to be advanced along the infeed guide, but the stop member is extended before the end of the workpiece reaches the stop member. Infeed of the workpiece then terminates when the end of the workpiece once again contacts the extended stop member. The stop member is preferably a plunger reciprocally mounted in a housing which is secured to the table along an axis which is perpendicular to the rail. The distance between the rail and the stop member in its retracted position is preferably less than twice the width of the workpiece to ensure that cut pieces of workpiece are advanced along the rail by the uncut end of the workpiece. The stop mechanism may be mounted on an outfeed guide having a planar guide surface which is parallel to the rail and spaced apart therefrom.

BRIEF DESCRIPTION OF THE DRAWINGS

FIG. 1 is an isometric view of a radial arm saw having the inventive stop mechanism installed thereon.

FIG. 2 is a top plan view of selected portions of the radial arm saw of FIG. 1.

FIG. 3 is a top plan view of the outfeed portion of the table on which the stop mechanism is installed during one portion of the infeed cycle.

FIG. 4 is a top plan view of a portion of the outfeed side of the table on which the stop mechanism is installed for a subsequent portion of the infeed cycle.

DETAILED DESCRIPTION OF THE INVENTION

Figure 5:
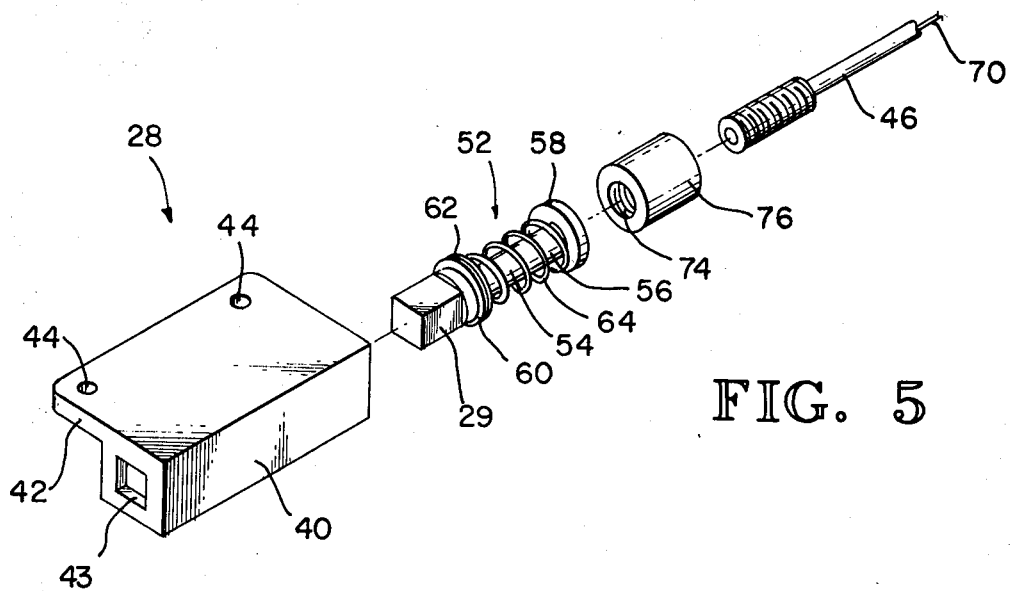
FIG. 5 is an exploded isometric view of one embodiment of a stop mechanism.

A conventional radial arm saw 10, as illustrated in FIG. 1, includes a table 12 having an upright support 14 on which is mounted an arm 16. A radial saw 18 is slidably mounted on the arm 16 so that it can move back and forth along the length of the arm 16 to cut a workpiece resting on the table 12 beneath the arm 16. As is well known in the art, the saw 18 contains a rotating circular blade having teeth formed about its periphery.

An elongated rail 20 having a planar guide surface 22 is mounted on the table 12. The rail 20 and guide surface 22 extends perpendicularly to the arm 16 and hence the direction of travel of the saw 18. The above-described features are conventional and are found, with slight modifications, on virtually every radial arm saw.

In accordance with the inventive stop mechanism, an infeed guide 24, also having a planar guide surface 25, is mounted on the table 12 in parallel with the rail 20. As explained in greater detail hereinafter, the guide surface 26 is spaced apart from the guide surface 22 a predetermined distance as dictated by the dimensions of other portions of the stop mechanism.

In operation, an elongated workpiece W is advanced along the guide surface 26 in a direction perpendicular to the path of the saw 18. When the workpiece W is in its proper position beneath the arm 16, the saw 18 is moved along the arm above the workpiece W to form a cut in the workpiece W.

Also in accordance with the inventive stop mechanism, a stop mechanism 28 having a stop member 29 is mounted on the outfeed side of the table 12 a predetermined distance from the track of the saw 18. Before a cut is started, the stop member 29 is in its extended position as illustrated in FIG. 2 so that as the workpiece W is advanced along the infeed guide surface 26 the end of the workpiece W abuts the extended stop member 29 to terminate infeed of the workpiece W after the end of the workpiece W has moved a predetermined distance beyond the end of the saw track. The stop mechanism 28 may be mounted directly on the outfeed side of the table 12, or it may be mounted on a stop mechanism support plate 30, which also has a planar guide surface 32. The stop mechanism support plate 30 is preferably easily movable about the table 12 in a conventional manner.

It is apparent that certain dimensional relationships must be maintained between the guide surfaces 22, 26, the stroke of the stop member 29, the width of the workpiece W and the distance between the stop member 29 and the rail 20. With particular reference now to FIG. 2, it will be noted that the infeed guide surface 26 is spaced apart from the rail guide surface 22 by a first predetermined distance (X). It will also be noted that the retracted stop member 29 is spaced apart from the rail guide surface 22 a second distance (Y). In order for the end of the workpiece W to clear the retracted stop member 29, the distance Y must be equal to or greater than the sum of the distance X and the width of the workpiece W. However, the distance Y less the stroke of the stop member (Z) must be less than the sum of the distance X and the width of the workpiece W or else the end of the workpiece W will not strike the extended stop member 20. Since the above-described dimensional relationships exist in the embodiment illustrated in FIG. 2, the end of the workpiece W is abutting the stop member 29, to allow the cut to be formed by moving the saw 18 (FIG. 1) along the saw track 16'. Also, the workpiece W can be advanced along the infeed guide surface 26 after the cut is formed since the end of the cut portion W' will clear the retracted stop member 29 as illustrated in FIG. 3.

It is important to note that it is necessary for the stop member 29 to be moved to its retracted position only momentarily. Significantly, it must be moved to its extended position before the end of the advancing workpiece W reaches the stop member 29. When the stop member is moved to its extended position as illustrated in FIG. 4, the cut piece W' is displaced toward the rail 20. Sufficient clearance is provided between the end of the extended stop member 29 and the rail guide surface 22 to provide clearance for the cut piece W'. Thus the function of the infeed guide 24 is to space the longitudinal edge of the workpiece W a sufficient distance from the rail 20 so that it may be displaced toward the rail 20 by the stop member 29 without binding against the rail 20. The distance (Y) between the outfeed guide surface 32 and the rail guide surface 22 is preferably less than twice the width of the workpiece W to ensure that the end of the workpiece W and cut pieces W' contact adjacent pieces W'.

Figure 6:
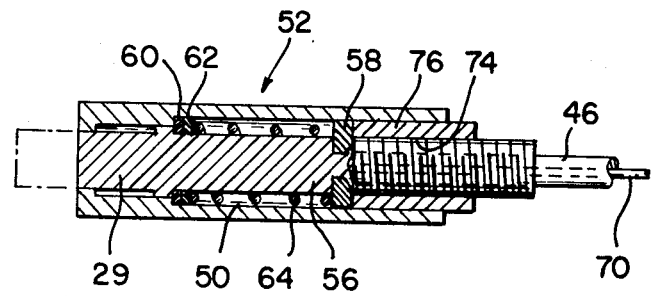
FIG. 6 is a cross-sectional view of the stop mechanism of FIG. 5.

Although a variety of stop member mechanisms may be employed, one embodiment is illustrated in FIGS. 5 and 6. The stop mechanism 28 includes a housing 40 having a mounting flange 42 projecting therefrom. The mounting flange 42 contains a pair of spaced apart mounting holes 44 through which suitable fasteners may be inserted into the support plate 30. One end wall of the housing 40 contains a rectangular aperture 43 through which the end of the stop member 29 may project as explained hereinafter. The opposite end of the housing 40 receives a conventional actuating cable 46 extending to an actuating button which may be mounted, for example, on the saw 18.

As best illustrated in FIG. 6, the housing 40 contains a cylindrical bore 50 in which a plunger assembly 52 is inserted. The plunger assembly 52 includes a plunger 54 having a cylindrical body 56 terminating in the stop member 29. An annular washer 58 is secured to the opposite end of the plunger 54 by suitable means, and a second washer 60 is secured to the plunger 54 adjacent the stop member 29. A third washer 62 is slidably mounted on the plunger 54, and a compression spring 64 extends between the washer 62 and the washer 58. When the plunger assembly 52 is inserted in the bore 50, the washer 62 abuts the end wall of the bore 50 adjacent the aperture 42 to resiliently bias the stop member 29 to its retracted position. When an actuating line 70 is moved with respect to the cable 46, the end of the line 70 moves the plunger 54 toward the rail 20, compressing the spring 56 and causing the stop member 29 to move to its extended position. When the actuating button is released, the spring 56 moves the plunger 54 inwardly so that the end of the stop member 29 is flush with the outer end wall of the housing 40. The end of the cable 46 is threated into a cylindrical bore 74 formed in a member 76 which is frictionally mounted within the bore 50.

I claim:

1. A stop mechanism for use with a radial arm saw of the type having a circular saw slidably mounted on an arm which extends horizontally above a planar table, said table having an elongated rail extending perpendicularly beneath said arm to allow an elongated workpiece running along said rail beneath said arm to be cut by moving said saw along said arm, said stop mechanism comprising:

an elongated infeed guide mounted on said table at one side of said arm, said guide having a planar guide surface extending parallel to said rail a first distance from said rail;

a stop member mounted on said table at the side of said arm opposite said infeed guide, said stop member being movable toward and away from said rail a second distance to respective extended and retracted positions, the distance between said rail and said stop member in its retracted position being greater than the sum of said first distance and the width of said workpiece so that the infeed end of a cut piece of said workpiece can clear said stop member in its retracted position, the distance between said rail and said stop member in its retracted position being less than the sum of first distance, said second distance and the width of said workpiece so that the end of said workpiece strikes said stop member in its extended position, and the distance between said rail and said stop member in its retracted position being greater than the sum of said second distance and the width of said workpiece so that said cut piece can fit between said rail and said stop member in its extended position; and actuator means for selectively moving said stop member to its extended position as said workpiece is advanced along said infeed guide so that the end of said workpiece contacts said stop member, and for moving said stop member to its retracted position after said workpiece has been cut to allow said workpiece to be further advanced along said infeed guide while said cut piece passes between said stop member and rail as said stop member is once again moved to its extended position.

2. The stop mechanism of claim 1, wherein said stop member is a plunger reciprocally mounted in a housing which is secured to said table along an axis which is perpendicular to said rail.

3. The stop mechanism of claim 2, wherein said stop member is resiliently biased away from said rail toward its retracted position, and wherein said actuator means include a flexible, rigid cable loosely surrounding a flexible, rigid line so that said cable and line are axially movable with respect to each other, said cable being secured to said housing along the axis of said plunger away from said rail so that said plunger may be moved to its extended position by sliding said line in said cable thereby causing the end of said line to displace said plunger.

4. The stop mechanism of claim 3, wherein the end of said cable opposite said housing is secured to said saw, and an actuating member is mounted on the end of said line opposite of said plunger thereby allowing said plunger to be manually extended and retracted from said saw.

5. The stop mechanism of claim 1, wherein the distance between said rail and said stop member in its retracted position is less than twice the width of said workpiece to ensure that cut pieces of said workpiece are advanced along said rail by the uncut end of said workpiece.

6. The stop mechanism of claim 5, further including an outfeed guide having a planar guide surface which is parallel to said rail and spaced apart therefrom a distance equal to the distance between said rail and said stop member in its retracted position.

* * * * *